US012704422B2

(12) United States Patent
Taniuchi et al.

(10) Patent No.: US 12,704,422 B2
(45) Date of Patent: Aug. 11, 2026

(54) APPARATUS AND METHOD FOR FORCE SENSING, AND ELECTRONIC DEVICE

(71) Applicant: GOERTEK INC., Weifang (CN)

(72) Inventors: Hirotada Taniuchi, Weifang (CN); Katsumi Saito, Weifang (CN)

(73) Assignee: GOERTEK INC., Weifang (CN)

( * ) Notice: Subject to any disclaimer, the term of this patent is extended or adjusted under 35 U.S.C. 154(b) by 294 days.

(21) Appl. No.: 18/264,776

(22) PCT Filed: Feb. 9, 2021

(86) PCT No.: PCT/CN2021/076181
§ 371 (c)(1),
(2) Date: Aug. 9, 2023

(87) PCT Pub. No.: WO2022/170459
PCT Pub. Date: Aug. 18, 2022

(65) Prior Publication Data

US 2024/0094074 A1 Mar. 21, 2024

(51) Int. Cl.
*G01L 1/26* (2006.01)
*G01L 1/22* (2006.01)

(52) U.S. Cl.
CPC .............. *G01L 1/26* (2013.01); *G01L 1/2281* (2013.01); *G01L 1/2287* (2013.01)

(58) Field of Classification Search
CPC ........ G01L 1/26; G01L 1/2281; G01L 1/2287
(Continued)

(56) References Cited

U.S. PATENT DOCUMENTS 2,963,773 A * 12/1960 Starr ........................ G01B 7/16 428/428
4,541,496 A * 9/1985 Layer .................. G01G 3/1414 73/862.623
(Continued)

FOREIGN PATENT DOCUMENTS

CN 101566514 A 10/2009
CN 102539034 A 7/2012
(Continued)

OTHER PUBLICATIONS

Translation of DE-102004005184-A1 (Year: 2005).*
(Continued)

*Primary Examiner* — Nathaniel T Woodward
(74) *Attorney, Agent, or Firm* — Shih IP Law Group, PLLC

(57) ABSTRACT

An apparatus and a method for force sensing, and an electronic device. The apparatus includes a sensor and a filter. The sensor is configured to generate a first signal which is determined based on deformation of at least a part of the sensor and temperature of at least the part of the sensor. The part of the sensor is attached to a deformable portion of the electronic device. The filter is configured to receive the first signal, and remove a change from the first signal to acquire a second signal, where the change is due to the temperature of the part of the sensor. In comparison with the first signal, the second signal is less sensitive to the temperature, and therefore can indicate the deformation of the deformable portion more accurately. The electronic device can make an accurate response when the deformable portion deforms.

20 Claims, 8 Drawing Sheets

(58) Field of Classification Search
USPC .......................................................... 73/774
See application file for complete search history.

(56) References Cited

U.S. PATENT DOCUMENTS

| | | | | |
|---|---|---|---|---|
| 6,409,677 | B1 * | 6/2002 | Tulkki | A61B 5/01<br>600/549 |
| 2018/0024015 | A1 | 1/2018 | Berme et al. | |

FOREIGN PATENT DOCUMENTS

| | | | | |
|---|---|---|---|---|
| CN | 103196988 | A | 7/2013 | |
| CN | 104665851 | A | 6/2015 | |
| CN | 110617914 | A | 12/2019 | |
| DE | 102004005184 | A1 * | 1/2005 | B60T 17/22 |
| DE | 102017223739 | A1 * | 6/2018 | G01D 21/02 |

OTHER PUBLICATIONS

Translation of DE-102017223739-A1 (Year: 2018).*
International Search Report from International Application No. PCT/CN2021/076181 mailed Nov. 9, 2021.

* cited by examiner

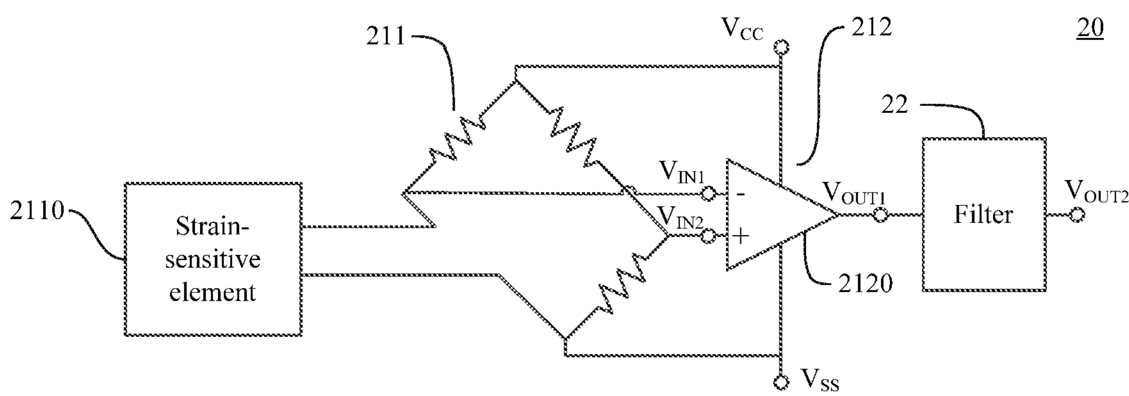
Fig. 11
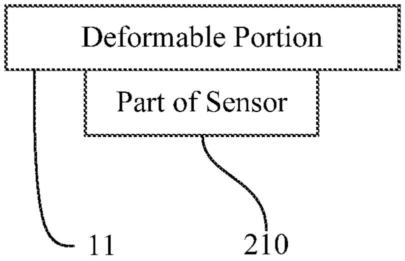
Fig. 12a
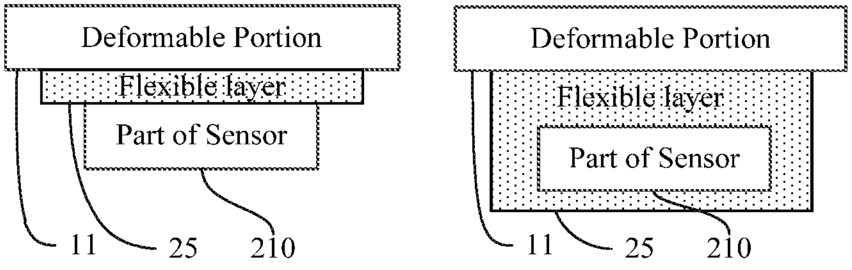
Fig. 12b
Fig. 12c

APPARATUS AND METHOD FOR FORCE SENSING, AND ELECTRONIC DEVICE

TECHNICAL FIELD

The present disclosure is related to the technical field of human-computer interaction, and in particular, to an apparatus and a method for force sensing, and an electronic device.

BACKGROUND

Recent decades have witnessed fast development of various electronic devices in people's daily life. In order to facilitate utilization, lots of input apparatuses are developed to help users interact with the electronic devices. Force-sensitive or strain-sensitive input apparatuses are becoming more and more popular, since they provide quite convenient force-sensing approaches for the interaction between the users and various types of electronic devices. For example, users can input instructions to a mobile phone or a computer by simply touching, pressing, tapping, gripping, or stretching an operation interface with a finger or a stylus.

The operation interface provided with the force-sensitive or strain-sensitive input apparatus are generally located at a deformable portion of the electronic device, for example, a virtual keyboard or a virtual button on a flexible display, a resilient part of a plastic shell, a thinned part of a metal housing, etc. The force-sensitive or strain-sensitive input apparatus detects deformation of the operation interface, i.e., detects a force or a strain induced by the operation, and thereby enables the electronic device to recognize such operation. FIG. 1 is a schematic structural diagram of a force-sensitive or strain-sensitive input apparatus of an electronic device in conventional technology. As shown in FIG. 1, the force-sensitive or strain-sensitive input apparatus includes a force sensor 3 located at the operation interface 2 of the electronic device 1, and an analog-to-digital comparator (ADC) 4. The force sensor 3 is configured to generate an electrical signal and transmit the electrical signal to the ADC 4. The ADC 4 is configured to compare such signal with a threshold defined by a preset threshold signal, and output a signal of which a state indicates a result of the comparison. The threshold indicates a degree of deformation which is to be recognized by the electronic device. Then, the result is transmitted to a controller (or a processor) 5, and the controller (or the processor) 5 determines whether the operation region deforms, based on the state of the signal.

Generally, the force sensor reflects the force or the strain at the operation region by using an electrical characteristic of the force sensor, and the electrical characteristic is sensitive to temperature. For example, the electrical characteristic may be related to resistance, which strongly depends on temperature according to a temperature coefficient of resistance of a material of the force sensor. Similarly, the electrical characteristic related to inductance also depends on the temperature.

Fast development of the electronic devices further results in increasingly complicated temperature environment within the electronic devices. In one aspect, the miniaturization of the electronic devices brings a great challenge on heat dissipation, and the temperature within an enclosure would change drastically when the electronic device is switched among different operation modes, such as a turbo-mode, an eco-mode, and a sleeping mode. In another aspect, ambient temperature of the electronic devices is rather unstable given various application scenarios. For example, a wearable electronic device exchanges heat with a skin of human body, and thereby the temperature of a housing when a user does some sports is higher than that when the user takes a rest. For another example, an outdoor electronic device would be heated in sunny weather and cooled in cloudy or rainy weather. Since the electrical characteristic, such as the resistance and the inductance, of the force sensor depends on the temperature, an output signal of the force sensor would drift from a theoretical value when the temperature is unstable. Even when there is no deformation at the operation interface, the result of the comparison at the ADC would indicate that the operation interface has deformed each time the drifting output signal reaches the threshold defined by the threshold signal. Consequently, the controller or the processor gives instructions based on erroneous detection, and the electronic device cannot work properly.

SUMMARY

In order to address the above technical issue, following technical solutions are provided according to embodiments of the present disclosure.

In a first aspect, an apparatus for force sensing is provided according to embodiments of the present disclosure. The apparatus is located in an electronic device, and the electronic device includes a deformable portion. The apparatus includes a sensor and a filter. The sensor is configured to generate a first signal, where the first signal is determined based on deformation of at least a part of the sensor and temperature of at least the part of the sensor, and the part of the sensor is attached to the deformable portion. The filter is configured to receive the first signal, and remove a change from the first signal to acquire a second signal, where the change is due to the temperature of the part of the sensor.

In one embodiment, the apparatus further includes at least one comparator. A comparator of the at least one comparator is configured to: receive the second signal; determine, based on the second signal and a threshold signal, whether the deformable portion deforms; generate a third signal, where the third signal is in an active state in response to determining that the deformable portion deforms.

In one embodiment, the apparatus further includes an analog-to-digital converter. The filter is an analog filter, and the analog-to-digital converter is configured to convert the second signal into a digital signal before the second signal is inputted into the comparator. Or, the filter is a digital filter, and the analog-to-digital converter is configured to convert the first signal into a digital signal before the first signal is inputted into the filter.

In one embodiment, the apparatus further includes a flexible layer attached to the deformable portion. The part of the sensor is attached to the deformable portion via at least a part of the flexible layer.

In one embodiment, the part of the sensor is a strain-sensitive element.

In one embodiment, the sensor includes a Wheatstone-bridge circuit and an amplifier circuit. An arm of the Wheatstone-bridge circuit includes the strain-sensitive element. The amplifier circuit includes an operational amplifier. An inverting input terminal and a non-inverting input terminal of the operational amplifier are coupled to two output terminals, respectively, of the Wheatstone-bridge circuit. An output terminal of the operational amplifier is coupled to an input terminal of the filter. The first signal comprises a first signal outputted from the output terminal of the operational amplifier.

In one embodiment, the strain-sensitive element is a strain gauge.

In one embodiment, the strain-sensitive element is a metallic foil pattern of a strain gauge, and the flexible layer is a backing layer on which the metallic foil pattern is printed.

In one embodiment, the part of the sensor is embedded within the flexible layer.

In one embodiment, the flexible layer includes one or both of a layer made of a thermal insulating material, and a heat spreading layer. In the heat spreading layer, thermal conductivity along a thickness of the heat spreading layer is smaller than thermal conductivity within a plane perpendicular to the thickness of the heat spreading layer.

In one embodiment, in the heat spreading layer, the thermal conductivity along the thickness of the heat spreading layer is a tenth of the thermal conductivity within the plane perpendicular to the thickness of the heat spreading layer.

In one embodiment, thermal conductivity of the thermal insulating material is equal to or smaller than 0.1 W/mK along a thickness of the flexible layer.

In one embodiment, the thermal insulating material includes one or more graphite sheets, rock wool, or pulp.

In one embodiment, a thickness of the part of the flexible layer ranges from 25 um to 500 um.

In one embodiment, the filter includes at least one of a high-pass filter, a band-pass filter, or a band-stop filter.

In one embodiment, the analog-to-digital converter is integrated with at least one of the sensor, the filter, or the comparator in a circuit.

In one embodiment, the threshold signal includes a threshold signal for compression. The comparator is further configured to determine whether the deformable portion is squeezed, based on the second signal and the threshold signal for compression. The third signal is in the active state in response to the deformable portion being squeezed.

In one embodiment, the threshold signal comprises a threshold signal for tension. The comparator is further configured to determine whether the deformable portion is stretched, based on the second signal and the threshold signal for tension. The third signal is in the active state in response to the deformable portion being stretched.

In a second aspect, an electronic device is provided according to embodiments of the present disclosure. The electronic device includes any of the aforementioned apparatuses, the deformable portion, and a hardware module. The hardware module is configured to receive the second signal, where a state of the hardware module changes in response to a state of the second signal being changed. Or, the hardware module is configured to receive the third signal, where a state of the hardware module changes in response to the third signal being in the active state.

In one embodiment, the hardware module includes at least one of: a processor, a controller, a display, a speaker, a switch, or an indicator light.

In one embodiment, the electronic device comprises at least one of: a mobile phone, a watch, glasses, a head-mounted display device, an earbud, a keyboard, or a tablet.

In a third aspect, a method for force sensing is provided according to embodiments of the present disclosure. The method is applied to an electronic device, and includes: generating a first signal by a sensor, where the first signal is determined based on deformation of at least a part of the sensor and temperature of at least the part of the sensor, and the part of the sensor is attached to a deformable portion of the electronic device; receiving the first signal by a filter; and removing, by the filter, a change from the first signal to acquire a second signal, wherein the change is due to the temperature of the part of the sensor.

In one embodiment, the method further comprises: receiving the second signal by a comparator of at least one comparator; determining, by the comparator based on the second signal and a threshold signal, whether the deformable portion deforms; and generating a third signal by the comparator, wherein the third signal is in an active state in response to determining that the deformable portion deforms.

The apparatus and the method for force sensing, and the electronic device are provided. The apparatus includes the sensor and the filter. The sensor is configured to generate the first signal which is determined based on deformation of at least the part of the sensor and temperature of at least the part of the sensor. The part of the sensor is attached to the deformable portion of the electronic device. The filter is configured to receive the first signal, and remove the change from the first signal to acquire the second signal, where the change is due to the temperature of the part of the sensor. In comparison with the first signal, the second signal is less sensitive to the temperature, and therefore can indicate the deformation of the deformable portion more accurately. The electronic device can make an accurate response when the deformable portion deforms.

BRIEF DESCRIPTION OF THE DRAWINGS

Hereinafter briefly described are drawings to be applied in embodiments of the present disclosure or conventional techniques. Other drawings may be obtained by those skilled in the art based on the provided drawings without creative efforts.

FIG. 11 is a schematic structural diagram of an apparatus for force sensing according to an embodiment of the present disclosure;

FIGS. 12*a* to 12*c* are schematic structural diagrams of a cross-sectional view of a part of a sensor attached to a deformable portion according to embodiments of the present disclosure;

DETAILED DESCRIPTION OF THE EMBODIMENTS

Hereinafter technical solutions in embodiments of the present disclosure are described in conjunction with the drawings in embodiments of the present closure. It is appreciated the described embodiments are only some rather than all of the embodiments of the present disclosure. Any other embodiments obtained based on the embodiments of the present disclosure by those skilled in the art without any creative effort fall within the scope of protection of the present disclosure.

As described in the background, a conventional force-sensitive or strain-sensitive input apparatus is subject to drifting output signals of the force sensor, and thereby gives incorrect result regarding whether the operational interface deforms. Hereinafter details of such technical issue are described, where it is taken as example that the force sensor is based on a strain gauge. Those skilled in the art would appreciate that such technical issue is also applicable mutatis mutandis to other types of force sensor, as long as the force sensor is temperature-sensitive.

Figure 2:
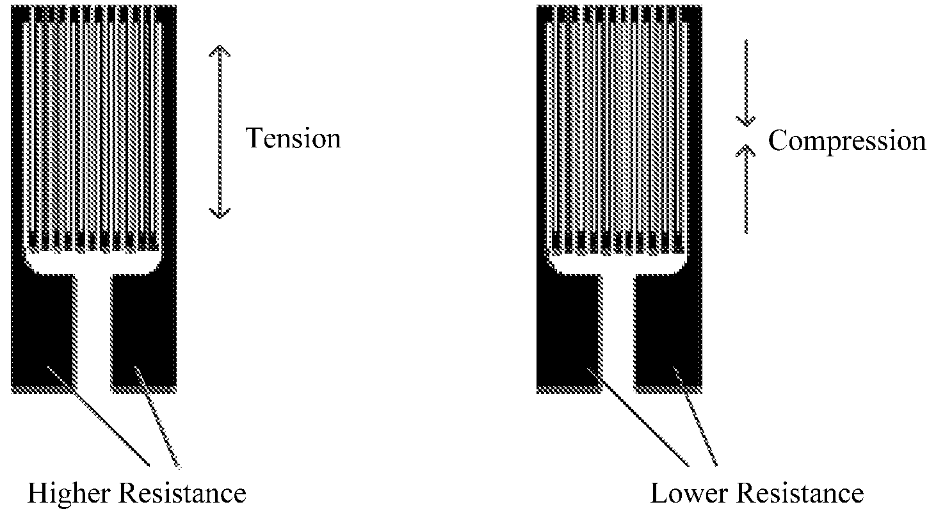
FIG. 2 is a schematic diagram of a strain gauge and operating states of the strain gauge in conventional technology.

Reference is made to FIG. 2, which is a schematic diagram of a strain gauge and operating states of the strain gauge in conventional technology. A strain gauge is configured to measure a strain on an object. A common type of strain gauge may consist of an insulating flexible backing which supports a metallic foil pattern, as shown in FIG. 2. The metallic foil pattern includes a winding pattern, of which a thickness is sensitive to strain, and two terminals at two ends of the winding pattern. The strain gauge may be attached to the object by a suitable adhesive. The foil pattern would deform when the object deforms, and an electrical resistance of the foil pattern changes accordingly. Generally, a compression on the object would thicken the metallic foil pattern, and thereby a resistance of the strain gauge is decreased. On the contrary, a tension on the object would thin the metallic foil pattern, and thereby a resistance of the strain gauge is increased. In practice, the two terminals may be connected into an arm of a Wheatstone bridge, which is a common approach for measuring a resistance.

A typical structure of the Wheatstone bridge includes an upper arm and a lower arm, each of which includes two resistors connected at a common node. Three of the four resistors are of fixed resistances, while the other is of a variable (or to-be-measured) resistance. Two ends of the upper arm are connected to two ends of the lower arm, respectively, and the two connection nodes serve as two output terminals of the Wheatstone bridge. The two common nodes in the upper arm and the lower arm serve as power supply terminals to the Wheatstone bridge. Therefore, in a case that the resistance of the three resistors and a voltage across the two power supply terminals are known, the to-be-measured resistance can be deduced from a voltage between the two output terminals. Those skilled in the art can easily obtain other variants of a Wheatstone-bridge circuit, which are not described in detail herein.

Figure 1:
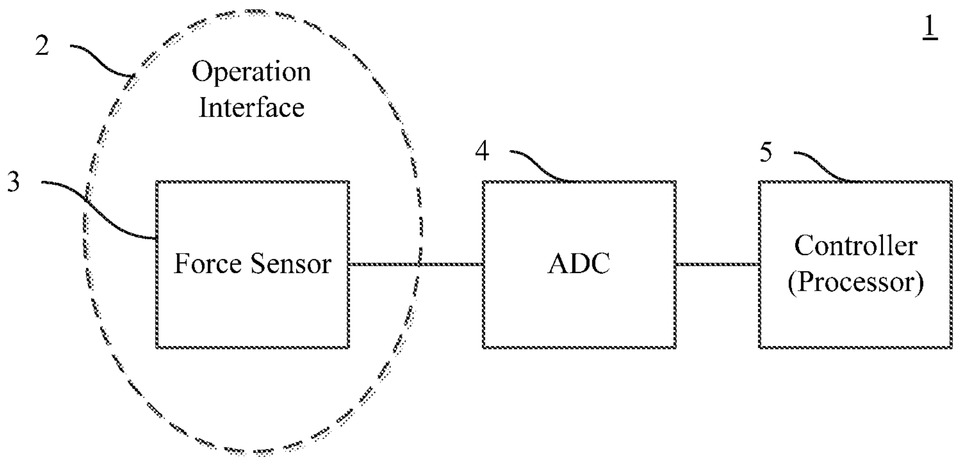
FIG. 1 is a schematic structural diagram of a force-sensitive or strain-sensitive input apparatus of an electronic device in conventional technology.
Figure 3:
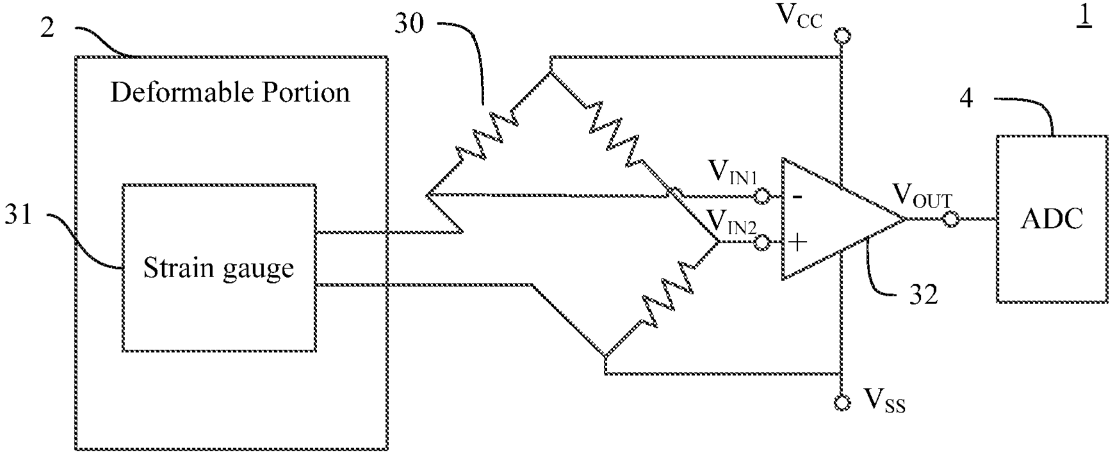
FIG. 3 is a schematic structural diagram of a force-sensitive or strain-sensitive input apparatus based on a strain gauge and a Wheatstone bridge.

Reference is then made to FIG. 3, which is a schematic structural diagram of a force-sensitive or strain-sensitive input apparatus based on a strain gauge and a Wheatstone bridge. The structure as shown in FIG. 3 is on a basis of that shown in FIG. 1, where the force sensor 3 includes a Wheatstone-bridge circuit 30 and an operational amplifier 32. A lower arm of the Wheatstone-bridge circuit 30 includes a strain gauge 31, which serves as the variable (or to-be-measured) resistor, and the strain gauge 31 is disposed on a deformable portion (such as an operation interface) 2 of the electronic device 1. The two output terminals of the Wheatstone-bridge circuit 30 are coupled to an inverting input terminal and a non-inverting input terminal of the operational amplifier 32, respectively. An output terminal of the operational amplifier 32 is coupled to an input terminal of the analog-to-digital converter (ADC) 4. In FIG. 3, signals at the inverting input terminal, the non-inverting input terminal, and the output terminal of the operational amplifier 32 are denoted as $V_{IN1}$, $V_{IN2}$, and $V_{OUT}$, respectively. There is $V_{OUT}=A*(V_{IN1}-V_{IN2})$, where A is the gain of the operational amplifier 32.

Figure 4:
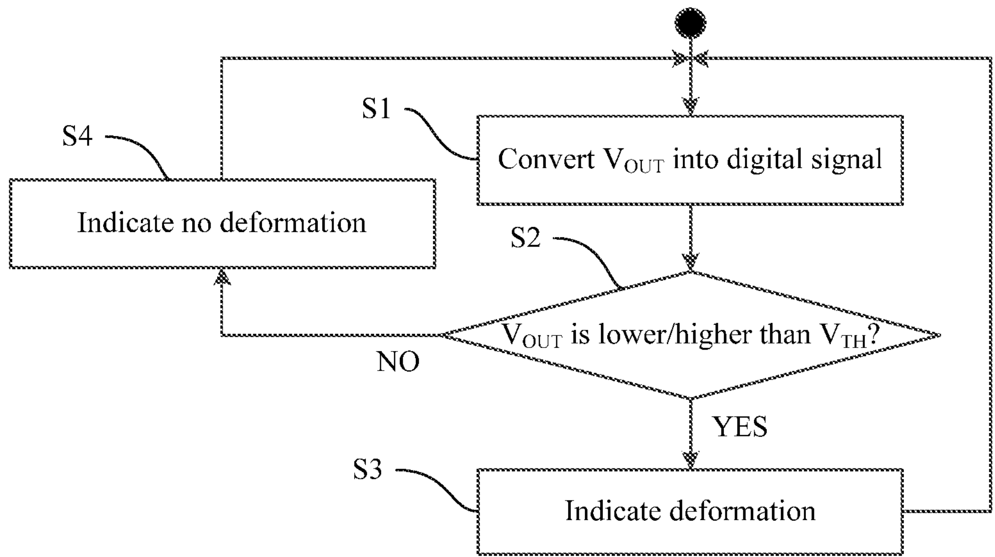
FIG. 4 is an operation algorithm of a comparator operating based on a strain gauge and a Wheatstone bridge.

The ADC may be provided with an algorithm for determining whether the deformable portion 2 deforms, on a basis of the structure as shown in FIG. 3. Reference is made to FIG. 4, which is an operation algorithm of the ADC operating based on a strain gauge and a Wheatstone bridge. In FIG. 4, the operation algorithm includes steps S1 to S4.

In step S1, the output signal $V_{OUT}$ is converted into a digital signal.

The operational amplifier amplifies a difference between the input signals $V_{IN1}$ and $V_{IN2}$ simply to generate the output signal $V_{OUT}$. Therefore, the output signal $V_{OUT}$ is an analog signal. As mentioned in the background, the ADC is configured to compare the output signal $V_{OUT}$ with a threshold signal $V_{TH}$. Generally, a signal should be digital for comparison, and thereby the ADC needs to perform analog-to-digital conversion on the output signal $V_{OUT}$. The threshold signal $V_{TH}$ may be preset as a digital level in the ADC, or may be a digital signal inputted into the ADC. The threshold signal $V_{TH}$ may alternatively be an analog signal inputted into the ADC. In such case, the ADC is further configured to convert the threshold signal $V_{TH}$ into a digital signal.

In step S2, it is determined whether the output signal $V_{OUT}$ is lower (or higher) than the threshold signal $V_{TH}$. The algorithm goes to step S3 in case of positive determination, and goes to step S4 in case of negative determination.

For convenience of illustration, it is assumed that the two input signals $V_{IN1}$ and $V_{IN2}$ of the operational amplifier 32 are balanced, namely, identical in value, in a case that the strain gauge 31 is in a zero-strain state. The zero-strain state refers to that the strain gauge 31 is subject to neither tension nor compression. Those skilled in the art can appreciate various manners to implement such assumption. For example, in FIG. 3, a ratio of a resistance of the left resistor in the upper arm to a resistance of the strain gauge 31 in the zero-strain state is equal to a ratio of a resistance of the right resistor in the upper arm to a resistance of the right resistor in the lower arm. The output signal $V_{OUT}$ of the operational amplifier 32 in case of the zero-strain state is denoted as a reference signal $V_{REF}$. In the aforementioned case, there is $V_{REF}=0$. In a case that the strain gauge 31 is subject to tension or compression, there would be $V_{OUT}>0$ or $V_{OUT}<0$, depending on a material of the strain gauge 31 and a connection manner between the Wheatstone-bridge circuit 30 and the operational amplifier 32. It is appreciated that the reference signal $V_{REF}$ may be another value when the resistances in the Wheatstone-bridge structure are configured in other manners.

Figure 5:
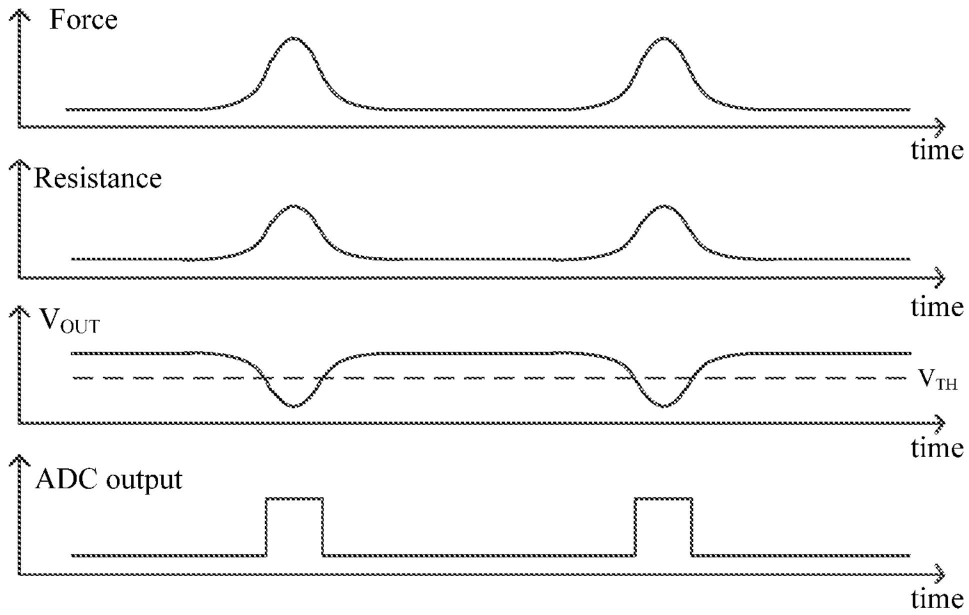
FIG. 5 is a schematic graph of a change in signals with respect to a force applied on a deformable portion.

Reference is made to FIG. 5, which is a schematic diagram of a change in signals with respect to a force (or a strain) at a deformable portion. It is taken as an example that the deformation of the deformable portion 2 is induced by an external force, of which a temporal profile is Gaussian-like. In a case that the deformable portion 2 is stretched (for example, a flat surface expanded due to a poke or a press applied by a user), the strain gauge 31 is subject to tension, and thereby the resistance of the strain gauge increases while the resistances of the three resistors in the Wheatstone-bridge circuit is not changed. Assuming the signal $V_{CC}$ is higher than the signal $V_{SS}$ in voltage, the inverting input signal $V_{IN1}$ is increased, while the non-inverting input signal $V_{IN2}$ is unchanged. Accordingly, the output signal $V_{OUT}$ is decreased. In order to discriminate an effective stretch from an unintentional stretch or a noise signal, the threshold signal $V_{TH}$ may be set as a level lower than the reference signal $V_{REF}$ (namely, $V_{TH}<0$ in the aforementioned case).

In step S3, the ADC indicates that the deformable portion deforms.

In step S4, the ADC indicates that the deformable portion does not deform.

Reference is further made to FIG. 5. In a case that the output signal $V_{OUT}$ is lower than the threshold signal $V_{TH}$, it means that the deformation (the tension, or the stretch) is strong enough to be recognized as an effective input signal (for example, a user press a virtual button firmly to switch an electronic device on), and an output signal of the ADC 4 would turn a high level to inform the controller (or the processor) 5 to perform an operation corresponding to the deformation (for example, switching the electronic device on). In a case that the output signal $V_{OUT}$ is higher than or equal to the threshold signal $V_{TH}$, it means that the deformation (the tension, or the stretch) is not strong enough to be recognized as an effective input signal (for example, a user touch the virtual button unintentionally), and an output signal of the ADC 4 would turn a low level and do not inform the controller (or the processor) 5 to perform the corresponding operation. In other words, the ADC 4 is capable to indicate whether the deformable portion deforms through a state of the output signal of the ADC 4.

The accuracy of the above algorithm depends on that the resistance of the strain gauge 31 can accurately reflect information of the force (or strain) at the deformable portion. Such accuracy deteriorates when taking into the account that the force sensor 3 is sensitive to temperature.

Generally, the temperature coefficient of resistance of metal materials is greater than zero. Since the strain gauge 31 is attached to the deformable portion 2, the resistance of the metallic foil pattern in the strain gauge 31 is in a positive correlation with the temperature of the deformable portion 2. That is, a rise in resistance is expected when the temperature of the deformable portion 2 increases, and a drop in resistance is expected when the temperature of the deformable portion 2 decreases.

Figure 6:
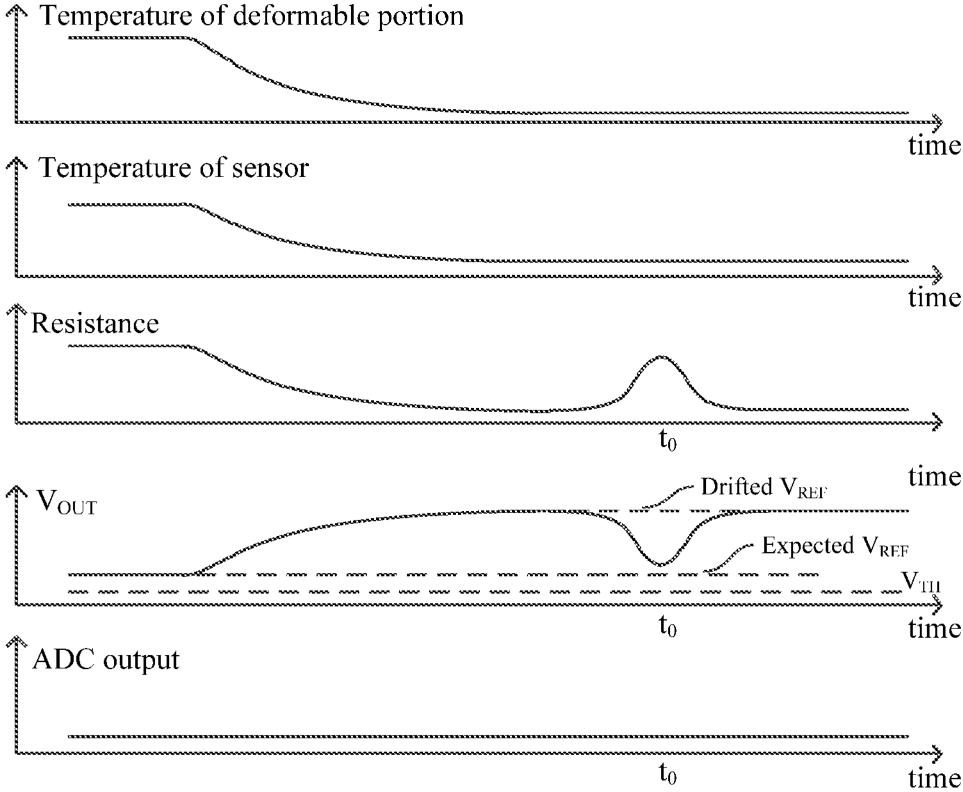
FIG. 6 is a schematic graph of a change in signals with respect to a force and temperature of a deformable portion.

Reference is made to FIG. 6, which is a schematic diagram of a change in signals with respect to a force (or a strain) and temperature of a deformable portion. It is taken as an example in FIG. 6 that temperature of the deformable portion 2 is subject to a gradual decrease. For example, the temperature of the deformable portion close to a central processing unit (CPU) may be decreased when the electronic device is switched from a turbo-mode to an eco-mode, or the temperature of the deformable portion attached to a metal housing may be decreased when a wearable device is detached from the human body. Apparently, the temperature of the strain gauge 31 would follow a similar change in that of the deformable portion 2, and the resistance of the strain gauge 31 is decreased accordingly. In such case, the inverting input signal $V_{IN1}$ is gradually decreased even when there is no squeeze (or tension) applied on the deformable portion 2, and thereby the actual reference signal $V_{REF}$ would drift to a level higher than the expected reference signal $V_{REF}$.

Around a moment to when the temperature has already been decreased, an external force same as the one induces the deformation as shown in FIG. 5 is applied to the deformable portion and serves an input operation. The force leads to a valley similar to those in FIG. 5. Namely, the output signal $V_{OUT}$ should dip from the reference signal $V_{REF}$ to a level lower than the threshold defined by the threshold signal $V_{TH}$, in a case that a difference between the reference signal $V_{REF}$ and the threshold signal $V_{TH}$ remains at an expected position. Nevertheless, since the reference signal $V_{REF}$ has drifted to a level above the expected portion, a difference between the actual (drifting) reference signal $V_{REF}$ and the threshold signal $V_{TH}$ is enlarged, and even a bottom of the valley may not reach the threshold defined by the threshold signal $V_{TH}$. Accordingly, a result of the comparison of the ADC 4 indicates that the output signal $V_{OUT}$ is kept higher than the threshold signal $V_{TH}$, therefore the ADC 4 would not turn the output signal thereof into an active state (such as a high level), and the controller (or processor) 5 is not informed of the deformation of the deformable portion. As a result, the electronic device may "miss" the input operation around the moment to and give no response.

According to embodiments of the present disclosure, a novel structure of an apparatus for force sensing is proposed, where a filter is incorporated to remove the change due to temperature from the signal outputted from the sensor, such that the signal is merely or mainly determined based on deformation of the deformable portion.

Figure 7:
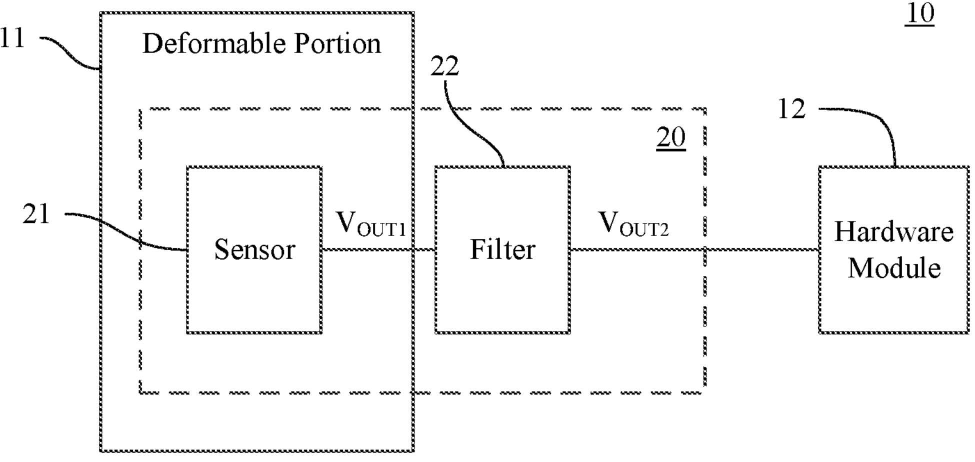
FIG. 7 is a schematic structural diagram of an electronic device applying an apparatus for force sensing according to an embodiment of the present disclosure.

Reference is made to FIG. 7, which is a schematic structural diagram of an electronic device applying an apparatus for force sensing according to an embodiment of the present disclosure. An apparatus 20 for force sensing is applied in an electronic device 10, and the electronic device 10 includes a deformable portion 11. The electronic device 10 may include a mobile phone, a watch, glasses, a head-mounted display device, an earbud, a keyboard, a tablet, or the like. The deformable portion may be a flexible display of a mobile phone, a wristband of a watch, an elastic frame of glasses or of a head-mounted display device, a metal or plastic housing of an earbud, a membrane of a keyboard, a resilient home key of a tablet, or the like. It is appreciated that the electronic device 10 and the deformable portion 11 are not limited to the above cases, and specific examples are not numerated herein for conciseness.

The apparatus 20 includes a sensor 21 and a filter 22. In order to facilitate illustration, only one sensor 21 and one filter 22 are shown in FIG. 7. Unless otherwise described, those skilled in the art can appreciate that following description regarding the sensor 21 and the filter 22 are also applicable mutatis mutandis to a case of multiple sensors 21 or multiple filters 22.

The sensor 21 is configured to generate a first signal $V_{OUT1}$. The first signal $V_{OUT1}$ is determined based on deformation of at least a part 210 of the sensor 21 and temperature of at least the part 210 of the sensor 21. The sensor 21 may be implemented in various forms as long as the first signal $V_{OUT1}$ generated by the sensor 21 is sensitive to both deformation and temperature of the part 210 of the sensor 21. In this embodiment, the part 210 of the sensor 21 is attached to the deformable portion 11. Reference may be made to FIG. 12*a*, which is a schematic structural diagram of a cross-sectional view of a part of a sensor attached to a deformable portion according to an embodiment of the present disclosure. In a case that the deformable portion 11 deforms, the part 210 of the sensor 21 deforms along with the deformable portion 11, or the part of the sensor 21 is at least subject to a strain due to deformation of the deformable portion 11. In a case that temperature of the deformable portion 11 changes (for example, the deformable portion is heated or cooled), the temperature of the part 210 of the sensor 21 also changes due to thermal conduction from the deformable portion 11. That is, the first signal $V_{OUT1}$ further depends on the deformation of the deformable portion 11 and the temperature of the deformable portion 11.

In one embodiment, the sensor 21 may include a Wheatstone-bridge circuit and an amplifier circuit. An arm of the Wheatstone-bridge circuit includes a strain-sensitive element serving as the part 210 of the sensor 21. The amplifier circuit includes an operational amplifier. An inverting input terminal and a non-inverting input terminal of the operational amplifier are coupled to two output terminals, respectively, of the Wheatstone-bridge circuit, and an output terminal of the operational amplifier is coupled to an input terminal of at least one comparator. The first signal $V_{OUT1}$ includes a signal outputted from the output terminal of the operational amplifier.

In this embodiment, the strain-sensitive element is mainly configured to detect the deformation of the deformable portion 11. The detection is implemented through an electrical characteristic of the strain-sensitive element, which is influenced by the deformation of the deformable portion 11. For example, the electrical characteristic is related to a resistance, an inductance, or a capacitance of the strain-sensitive element. The Wheatstone-bridge circuit is an efficient approach to accurately measure the electrical characteristic of the strain-sensitive element, especially when the electrical characteristic is related to the inductance or the capacitance. It is appreciated that the Wheatstone-bridge circuit may be replaced by another appropriate circuit according to a practical situation of the electrical characteristic.

In one embodiment, the electrical characteristic of the strain-sensitive element is related to resistance or inductance. For example, the strain-sensitive element is a strain gauge. Namely, the part 210 of the sensor 21 is a strain gauge. For another example, the strain-sensitive element includes two contacts separated by a gap, and a contact resistance (or inductance) between the two contacts changes monotonously with a width of the gap.

The amplifier circuit is mainly configured to amplify a measurement signal outputted from the Wheatstone-bridge circuit, so as to acquire the first signal $V_{OUT1}$. In one embodiment, the amplification is implemented by the operational amplifier. The operational amplifier may be connected in various manners, for example, in an open-loop mode, in a closed-loop mode, in a negative-feedback mode, in a low-pass filter mode, or in an integrator-circuit mode. The present disclosure is not limited thereto, and another connection manner may be applicable as long as the measurement signal outputted from the Wheatstone-bridge circuit can be amplified.

Generally, the electrical characteristic of the strain-sensitive element is sensitive to temperature of the sensor 21. Therefore, even if the measurement of Wheatstone-bridge circuit (or another measurement circuit) and the amplification of the amplifier circuit are accurate, the first signal $V_{OUT1}$ may not reflect the deformation accurately due to its dependency on the temperature.

The filter 22 is configured to remove a change, which is due to the temperature of the part 210 of the sensor 21, from the first signal $V_{OUT1}$ to acquire a second signal $V_{OUT2}$. Generally, the temperature of the part 210 of the sensor 21 varies due to thermal conduction from the deformable portion 11, on which the part 210 is attached. The nature of the thermal conduction limits that the heat flux intensity is always in negative proportion to the temperature gradient. Thereby, heat is only capable to permeate into a new region gradually, which means it costs some time for the temperature of the part 210 to follow the temperature of the deformable portion 11. As a result, the variation in temperature of the part 210 of the sensor 21 usually follows a mild slope. In comparison, the deformation to be recognized by the electronic device 10 is caused by a change of a mechanical state of the electronic device 10, for example, caused by a part of the electronic device 10 being pressed, gripped, or folded. Such mechanical variation occurs within a short period, and is usually not delayed (cushion neglected) when transferred to the deformable portion 11 as well as the attached part 210. Hence, for the part 210 of the sensor 21, the deformation is more abrupt than the variation in temperature. When reflected by changes of the first signal $V_{OUT1}$, the two above kinds of variation are separate from each other in a frequency spectrum of the first signal $V_{OUT1}$. A change due to the deformation of the part 210 of the sensor 21 (hereinafter called a first change) is located in a higher frequency region, while a change due to the temperature of the part 210 of the sensor 21 (hereinafter called a second change) is located in a lower frequency region. Thereby, the filter 22 may remove the second change from the first signal $V_{OUT1}$ through applying an appropriate threshold in frequency. The removal may be implemented in various manners. For example, a frequency region in which the second change is located may be zeroed out. As a consequence of the removal, information of the first change is retained in the second signal $V_{OUT2}$, while information of the second change is not present in the second signal $V_{OUT2}$.

The filter 22 may be implemented in various forms. In one embodiment, the filter 22 may include a high-pass filter. That is, frequency components below the frequency threshold may be zeroed out, such that the second change can be removed from the first signal. In another embodiment, the filter 22 may include a band-pass filter. That is, frequency components below a lower frequency threshold and above an upper frequency threshold may be zeroed out, such that both the second change and some high-frequency noise can be removed from the first signal. Alternatively, the filter 22 may include a band-stop filter. That is, the second change located between a lower frequency threshold and an upper frequency threshold may be zeroed out.

In one embodiment, the second signal $V_{OUT2}$ may be transmitted to a hardware module 12 of the electronic device 10. The hardware module 12 is configured to receive the second signal $V_{OUT2}$, and a state of the hardware module 12 changes in response to a state of the second signal $V_{OUT2}$ being changed. For example, the hardware module 12 may be a switch transistor, where the switch transistor is switched on when the second signal $V_{OUT2}$ rises above a threshold, and is switched off when the second signal $V_{OUT2}$ falls below the threshold. For another example, the hardware module 12 may be an analogy-to-digital (AD) converter, where the AD converter outputs a high level when the second signal $V_{OUT2}$ rises above a threshold, and outputs a low level when the second signal $V_{OUT2}$ falls below the threshold.

In the apparatus 20 for force sensing according to above embodiments of the present disclosure, the sensor 21 generates the first signal $V_{OUT1}$, which is determined based on the deformation of the part 210 of the sensor 21 and the temperature of the part 210 of the sensor 21. The filter 22 removes the change due to the temperature of the part 210 of the sensor 21 from the first signal $V_{OUT1}$, so as to acquire the second signal $V_{OUT2}$. In comparison with the first signal, the second signal $V_{OUT2}$ depends more on the deformation of the part 210 of the sensor 21, and is less sensitive to the temperature of the part 210 of the sensor 12. Therefore, the state of the second signal $V_{OUT2}$ can indicate the deformation of the deformable portion 11 accurately. Correspondingly, the electronic device 10 applying the apparatus 20 can make an accurate response when the deformation of the deformable portion 11 serves as an input operation.

Hereinafter some embodiments are provided for better understanding of technical solutions of the present disclosure. The present disclosure is not limited to these embodiments.

Figure 8:
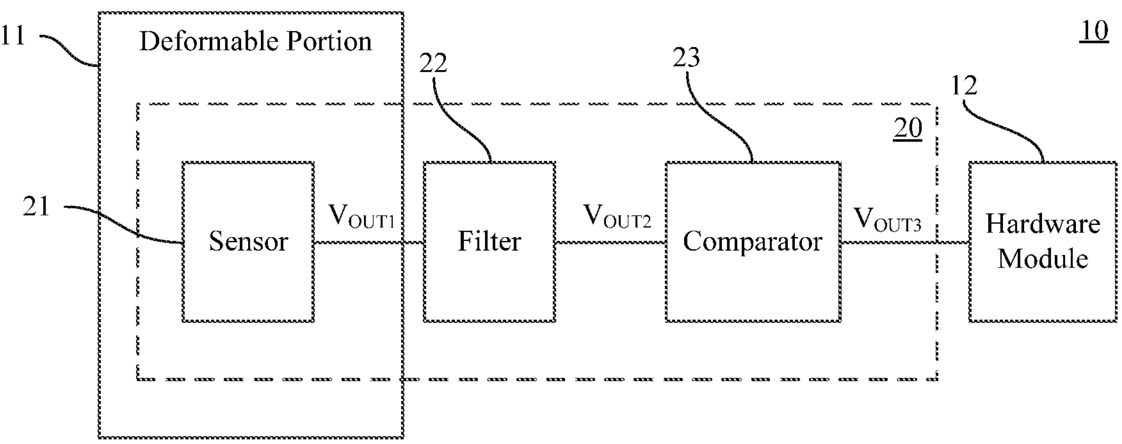
FIG. 8 is a schematic structural diagram of an electronic device applying an apparatus for force sensing according to another embodiment of the present disclosure.

Reference is made to FIG. 8, which is a schematic structural diagram of an electronic device applying an apparatus for force sensing according to another embodiment of the present disclosure. On a basis of the structure as shown in FIG. 7, the apparatus 20 further includes a comparator 23. The comparator 23 is configured to receive the second signal $V_{OUT2}$. It is appreciated that the reception of the second signal $V_{OUT2}$ may be implemented by coupling an output terminal of the filter 22 to an input terminal of the comparator 23. The comparator 23 may be an AD comparator, or may include an AD converter and a processor for comparing digital signals. In some embodiments, multiple comparators 23 may be configured to receive the second signal $V_{OUT2}$. Hereinafter the discussion is mainly focused on one comparator 23, and it is appreciated that such discussion may also be applied to each of the multiple comparators 23.

The comparator 23 is further configured to determine whether the deformable portion 11 deforms, based on the second signal $V_{OUT2}$ and a threshold signal $V_{TH}$ (not shown in FIG. 8). Since the part 210 of the sensor 21 is attached to the deformable portion 11, deformation of the deformable portion 11 is capable to be reflected by deformation of the part 210 of the sensor 21. Therefore, the second signal $V_{OUT2}$ including information of deformation of the part 210 of the sensor 21 can serve as a basis for the determination. The threshold signal $V_{TH}$ corresponds to a degree of the deformation (of the deformable portion 11, or of the part 210 of the sensor 21 correspondingly) which is to be recognized by the electronic device 10. The threshold signal $V_{TH}$ may be preset as a digital level in the comparator 23, or may be a digital signal inputted into the comparator 23. Alternatively, the threshold signal $V_{TH}$ may be an analog signal inputted into the comparator 23, and the comparator 23 converts the threshold signal $V_{TH}$ into a digital signal before applying the threshold signal $V_{TH}$. The comparator 23 may determine whether the deformable portion 11 deforms in various manners. In one embodiment, the determination is carried out by comparing levels of the second signal $V_{OUT2}$ and the threshold signal $V_{TH}$. In a case that there are multiple comparators 23, the threshold signal $V_{TH}$ of different comparators 23 may be same or different.

The comparator 23 is further configured to generate a third signal $V_{OUT3}$, which is in an active state in response to determining that the deformable portion 11 deforms. The specific active state of the third signal $V_{OUT3}$ is based on a practical situation, which is not limited herein, as long as the active state is distinguishable in the third signal $V_{OUT3}$ and serves as an indication of the deformation of the deformable portion 11. For example, the active state may be a high level or "1", or may be a low level or "0".

Figure 9:
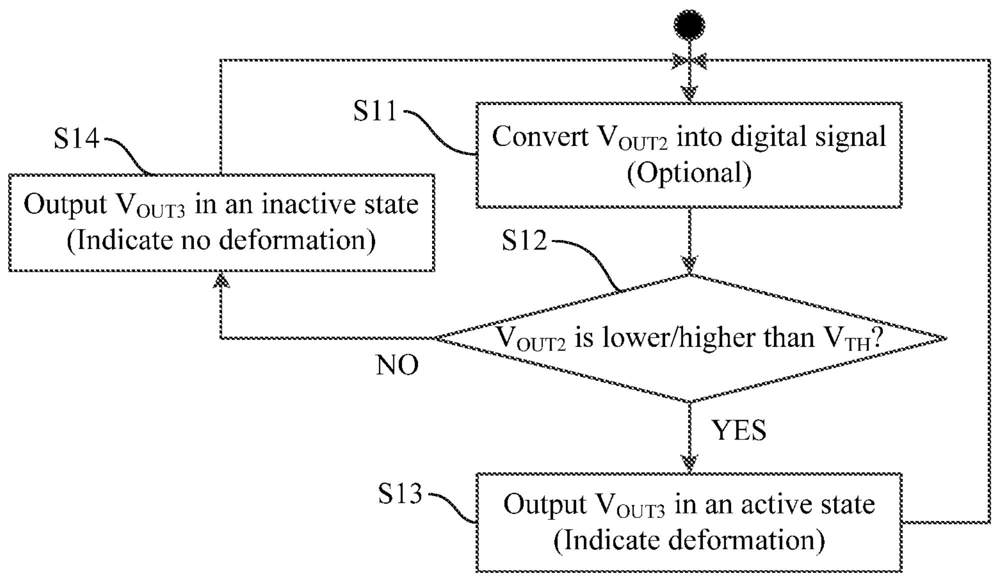
FIG. 9 is an operating algorithm of a comparator according to an embodiment of the present disclosure.

An operating algorithm of the comparator 23 may be as similar to that as shown in FIG. 4. FIG. 9 is an operating algorithm of the comparator 23 according to an embodiment of the present disclosure. In FIG. 9, an operating algorithm of the comparator 23 may include steps S11 to S14.

In step S11, the second signal $V_{OUT2}$ is converted into a digital signal. It is appreciated that the step S11 may be omitted in a case that the second signal $V_{OUT2}$ is a digital signal.

Figure 10A:
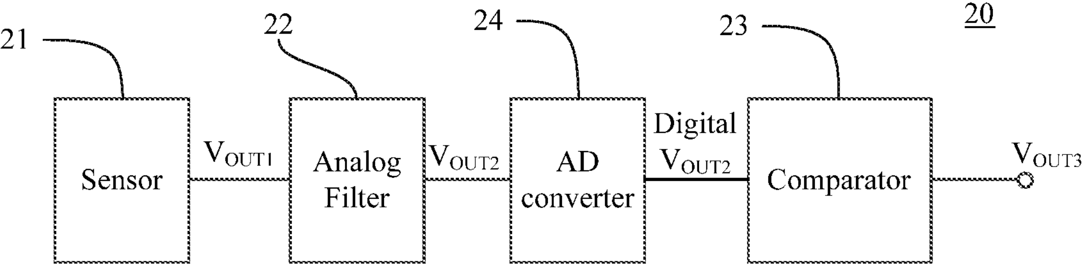
FIGS. 10*a* and 10*b* are schematic structural diagrams of an apparatus for force sensing according to other embodiments of the present disclosure.

The second signal $V_{OUT2}$ may be analog when outputted from the filter 22. Namely, the filter 22 may be an analog filter. Generally, a digital signal is better for comparison than an analog signal. Therefore, AD conversion needs to be performed on the second signal $V_{OUT2}$, before the determination based on the second signal $V_{OUT2}$ and the threshold signal $V_{TH}$. In such case, the apparatus 20 may further include an AD converter 24. Reference is made to FIG. 10*a*, which is a schematic structural diagram of an apparatus for force sensing according to another embodiment of the present disclosure. The AD converter 24 may be coupled between the filter 22 and the comparator 23, and is configured to convert the second signal $V_{OUT2}$ into a digital signal before the second signal $V_{OUT2}$ is inputted into the comparator 23.

It is appreciated that in the above case, the AD converter may be integrated with the filter 22 or the comparator in a circuit. Namely, the filter 22 may filter the first signal $V_{OUT1}$ first to acquire the analog second signal $V_{OUT2}$ and then perform the AD conversion on the analog second signal $V_{OUT2}$, or the comparator may perform the AD conversion on the analog second signal $V_{OUT2}$ first and then determines based on the converted second signal $V_{OUT2}$.

Figure 10B:
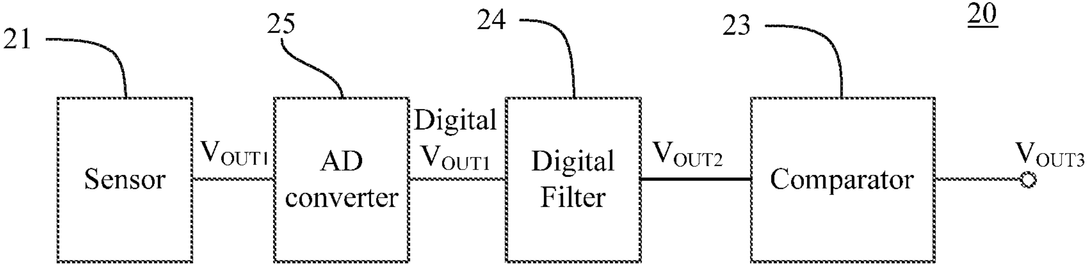

Alternatively, the second signal $V_{OUT2}$ may be digital when outputted from the filter 22. Namely, the filter 22 may be a digital filter. The digital filter may be integrated with the comparator in a circuit. Since the first signal $V_{OUT1}$ is generally an analog signal outputted from the sensor 21, AD conversion needs to be performed on the first signal $V_{OUT1}$ before the first signal $V_{OUT1}$ is filtered. Reference is made to FIG. 10*b*, which is a schematic structural diagram of an apparatus for force sensing according to another embodiment of the present disclosure. The AD converter 25 may be coupled between the sensor 21 and the filter 24, and is configured to convert the first signal $V_{OUT1}$ into a digital signal before the first signal $V_{OUT1}$ is inputted into the filter 24.

It is appreciated that in the above case, the AD converter may be integrated with the sensor 21 or the filter 22 in a circuit. Namely, the sensor 21 may convert the analog first signal $V_{OUT1}$ and output a digital signal directly, or the filter 22 may perform the AD conversion on the analog first signal $V_{OUT1}$ first and then filter the converted first signal $V_{OUT1}$.

In step S12, it is determined whether the second signal $V_{OUT2}$ is lower (or higher) than the threshold signal $V_{TH}$.

The operating algorithm goes to step S13 in case of positive determination, and goes to step S14 in case of negative determination.

Whether the determination concerns being lower than the threshold signal $V_{TH}$ or being higher than the threshold signal $V_{TH}$ depends on a practical situation. In a case that the deformation would cause a rise in the second signal $V_{OUT2}$, the threshold signal $V_{TH}$ is generally set to be a level higher than the second signal $V_{OUT2}$ at a referential state, and the determination is whether being higher the threshold signal $V_{TH}$. In a case that the deformation would cause a drop in the second signal $V_{OUT2}$, the threshold signal $V_{TH}$ is generally set to be a level lower than the second signal $V_{OUT2}$ at the referential state, and the determination is whether being lower than the threshold signal $V_{TH}$. The referential state refers to that the deformable portion 11 is subject to no deformation or a preset referential degree of deformation. Hereinafter the second signal $V_{OUT2}$ at the referential state is referred to as a reference signal $V_{REF2}$. Correspondingly, the first signal $V_{OUT1}$ at the referential state is referred to as a reference signal $V_{REF1}$.

It is noted that when the second signal $V_{OUT2}$ is equal to the threshold signal $V_{TH}$, the comparator 23 may either determine that the deformable portion 11 deforms or determine that the deformable portion does not deform, according to a practical requirement.

In step S13, the third signal $V_{OUT3}$ is outputted in the active state. The active state indicates that the deformable portion 11 deforms.

In step S14, the third signal $V_{OUT3}$ is outputted in an inactive state. The inactive state is one or more states of the third signal $V_{OUT3}$ other than the active state, and indicates that the deformable portion 11 does not deform.

In one embodiment, the third signal $V_{OUT3}$ may be transmitted to a hardware module 12 of the electronic device 10. The hardware module 12 is configured to receive the third signal $V_{OUT3}$, and a state of the hardware module 12 changes in response to the third signal being in the active state.

It is appreciated that the above operating algorithm is merely an example, and the comparator 23 may apply another operating algorithm in practice.

Reference is made to FIG. 11, which is a schematic structural diagram of an apparatus for force sensing according to an embodiment of the present disclosure. On a basis of the structure as shown in FIG. 7, the sensor 21 includes a Wheatstone-bridge circuit 211 and an amplifier circuit 212. An arm of the first Wheatstone-bridge circuit 211 includes a strain-sensitive element 2110, and the strain-sensitive element 2110 serves as the part 210 of the sensor 21. The amplifier circuit 212 includes an operational amplifier 2120. An inverting input terminal and a non-inverting input terminal of the operational amplifier 2120 are coupled to two output terminals, respectively, of the Wheatstone-bridge circuit 211. An output terminal of the first operational amplifier 2120 is coupled to an input terminal of the comparator 23. The first signal $V_{OUT1}$ includes a signal outputted from the output terminal of the operational amplifier 2120.

Those skilled in the art can appreciate that topologies of the Wheatstone-bridge circuit 211 and the amplifier circuit 212 are merely exemplary, and other variants of the topologies may be obtained without creative efforts. For example, any resistor in the Wheatstone-bridge circuit 211 may be replaced by any quantity of resistors connected in series, parallel, or a combination of the two. For another example, the operational amplifier 2120 may be connected in a closed-loop mode, a negative-feedback mode, a low-pass filter mode, or an integrator-circuit mode, instead of the depicted open-loop mode. Further, the connection between the two output terminals of the Wheatstone-bridge circuit 211 and the two input terminals of the operational amplifier 2120 may be switched, namely, the signal $V_{IN1}$ is inputted into the non-inverting input terminal while the signal $V_{IN2}$ is inputted into the inverting input terminal.

As discussed above, the first change and the second change may be embodied as components of higher frequency and lower frequency, respectively, in the first signal $V_{OUT1}$. Thereby, the second change can be removed from the first signal $V_{OUT1}$ by frequency filtering. Generally, the frequency filtering is implemented by setting a threshold frequency, and the frequency components at one side of the threshold frequency are removed while those at the other side are retained. Hence, the more the first change and the second change are separated in frequency, the better a result of the filtering can be. Since the frequency of the first change is mainly determined based on how fast the deformable portion deforms, it is more convenient to reduce the frequency of the second change by modifying a structure of the apparatus 20 for force sensing. That is, the thermal conduction from the deformable portion 11 to the part 210 of the sensor 21 may be delayed, such that the second change is slowed down and moved into a lower frequency region, which improves the result of filtering.

In some embodiments, the apparatus 20 for force sensing further comprises a flexible layer 25 attached to the deformable portion. The part 210 of the sensor 21 is attached to the deformable portion 21 via at least a part of the flexible layer 25 The flexible layer 25 is configured to delay the thermal conduction from the deformable portion 11 to the part 210 of the sensor 21.

Figure 13A:
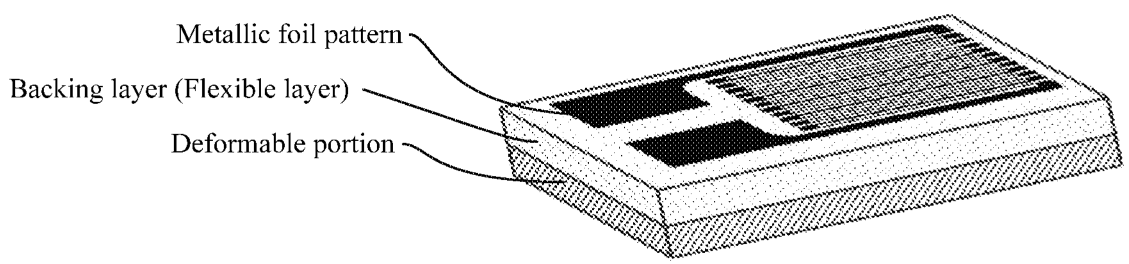
FIGS. 13*a* and 13*b* are schematic structural diagrams of a stereoscopic view of a strain gauge attached to a deformable portion according to embodiments of the present disclosure.
Figure 13B:
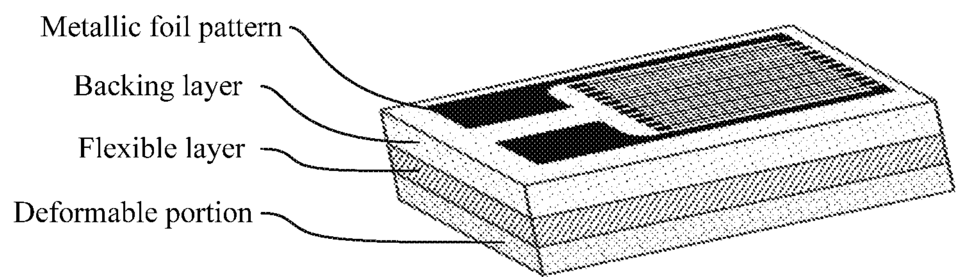

Reference is made to FIGS. 12*b* and 12*c*, which are schematic structural diagrams of a cross-sectional view of a part of a sensor attached to a deformable portion according to embodiments of the present disclosure. In FIG. 12*b*, the flexible layer 25 is located between the part 210 of the sensor 21 and the deformable portion 11. The flexible layer 25 may serve as an adhesive layer or an intermediate layer that attaches the part 210 of the sensor 21 to the deformable portion 11. It is noted that the part 210 of the sensor 21 may function with the flexible layer 25 as an integrated structure, or may function independently from the flexible layer 25 as a separate structure. Hereinafter it is taken as an example that a strain gauge is attached to the deformable portion 11. In one embodiment, the metallic foil pattern of the strain gauge may serve as the part 210 of the sensor 21, while the backing layer of the strain gauge may serve as the flexible layer 25, as shown in FIG. 13*a*. In such case, the strain gauge is directly attached to the deformable portion. In another embodiment, the whole strain gauge including the metallic foil pattern and the backing layer may serve as the part 210 of the sensor 21, and the flexible layer is a separate layer located between the strain gauge and the deformable portion, as shown in FIG. 13*b*. In such case, the strain gauge is attached to the deformable portion via the separate layer.

In FIG. 12*c*, the part 210 of the sensor 21 is embedded in the flexible layer 25. Hence, the flexible layer 25 may serve as an adhesive layer that attaches the part 210 of the sensor 21 to the deformable portion 11, and additionally or alternatively serves as a protection layer over the part 210 of the sensor 21. Similarly, the part 210 of the sensor 21 may function with the flexible layer 25 as an integrated structure, or may function independently from the flexible layer 25 as a separate structure.

The flexible layer 25 may achieve the function of delaying the thermal conduction from the deformable portion 11 to the part 210 of the sensor 21. In a first manner, the flexible layer 25 may be made of a thermal insulating material. Namely, thermal conductivity of the flexible layer 25 is low, thus hindering heat flowing through the flexible layer. In a second manner, the flexible layer may be a heat spreading layer, which has anisotropic heat conductivity, especially between a direction along the thickness and a direction parallel with the layer surface.

Figure 14:
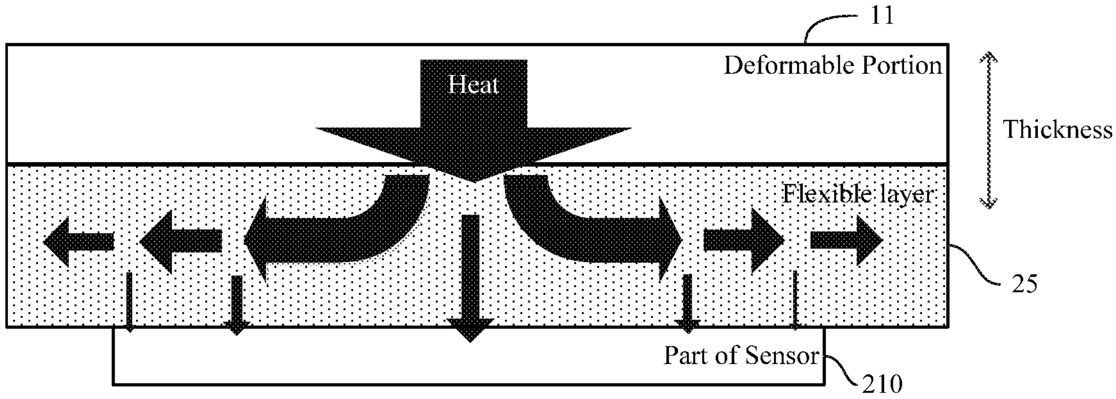
FIG. 14 is a schematic diagram of heat conduction through a flexible layer according to an embodiment of the present disclosure.

A function of the heat spreading layer is briefly illustrated as follows. Reference may be made to FIG. 14, which is a schematic diagram of heat conduction through a flexible layer according to an embodiment of the present disclosure. In this embodiment, the heat spreading layer serves as the flexible layer 25. As shown in FIG. 14, heat is transmitted from the deformable portion 11 to the part 210 of the sensor 21 via the flexible layer 25. When heat flows into the flexible layer 25 from the deformable portion 11, the thermal conduction at each location within the flexible layer 25 may be decomposed into two heat fluxes, i.e., a vertical flux along a thickness of the flexible layer and a horizontal flux within a plane perpendicular to the thickness. The vertical flux is transmitted toward the part 210 of the sensor 21. The horizontal flux is transmitted in parallel with an interface between the deformable portion 11 and the flexible layer 25. The vertical flux determines how fast the heat is transmitted along the thickness, namely, how fast the heat is transmitted towards the part 210 of the sensor 21. The horizontal flux determines how fast the heat is transmitted along the plane perpendicular to the thickness, namely, how fast the heat is diffused within the flexible layer 25. It is appreciated that the more the heat is diffused within the flexible layer 25, the less the heat is transmitted towards the part 210 of the sensor 21, and the more the thermal conduction from the deformable portion 11 to the part 210 of the sensor 21 is delayed.

Ratios of the vertical and horizontal fluxes depend on thermal conductivity of the flexible layer 25 along the thickness and thermal conductivity of the flexible layer 25 in the plane perpendicular to the thickness, respectively. In order to increase the heat diffused within the flexible layer 25, the flexible layer 25 may be made of a material of which thermal conductivity along the thickness is smaller than that perpendicular to the thickness. Generally, the thermal conductivity along the thickness is a tenth of that perpendicular to the thickness. In one embodiment, the thermal conductively along the thickness may be 1 W/mK, while that in the plane perpendicular to the thickness may be 300 W/mK. Graphite sheets is a good candidate of the flexible layer 25, because heat is transmitted much faster within each sheet plane than in the direction perpendicular to the sheet plane.

As mentioned above, the flexible layer 25 may alternatively be made of the thermal insulating material, such as rock wool or pulp. In some embodiment, the thermal conductivity is equal to or smaller than 0.1 W/mK.

The flexible layer 25 may further include a stack structure of multiple layers. Each layer may be made of a separate thermal insulating material, or may be a separate heat spreading layer. In one embodiment, at least one of the multiple layers is made of a thermal insulating material, and at least another of the multiple layers is a heat spreading layer.

Since the heat is continuously diffused in directions perpendicular to the thickness when being transmitted toward the part 210 of the sensor 21, the delay of the thermal conduction may further be strengthened by increasing the thickness of the flexible layer 25. It is noted that such thickness should not be too large, otherwise the deformation of the deformable portion 11 may be over-cushioned and cannot be transferred to the part 210 of the sensor 21. Therefore, the thickness of the flexible layer 25 should be determined based on requirements on both thermal-conduction delay and deformation-detection sensitivity. In practice, the thickness of the part of the flexible layer 25 (namely, the flexible layer 25 located between the part 210 of the sensor 21 and the deformable portion 11) generally ranges from 25 um to 500 um.

Additionally, the flexible layer 25 attached to the deformable portion 11 deforms along with the deformable portion 11. It is appreciated that the deformation transmitted from the deformable portion 11 to the part 210 of the sensor 21 is not delayed by the flexible layer 25 as long as the flexible layer 25 is not highly elastic. Consequently, only the second change may be shifted to a lower frequency. Hence, the flexible layer 25 is capable to separate first change and the second change in the frequency domain, facilitating the filter 22 removing the second change while retaining the first change in the first signal $V_{OUT1}$.

Figure 15:
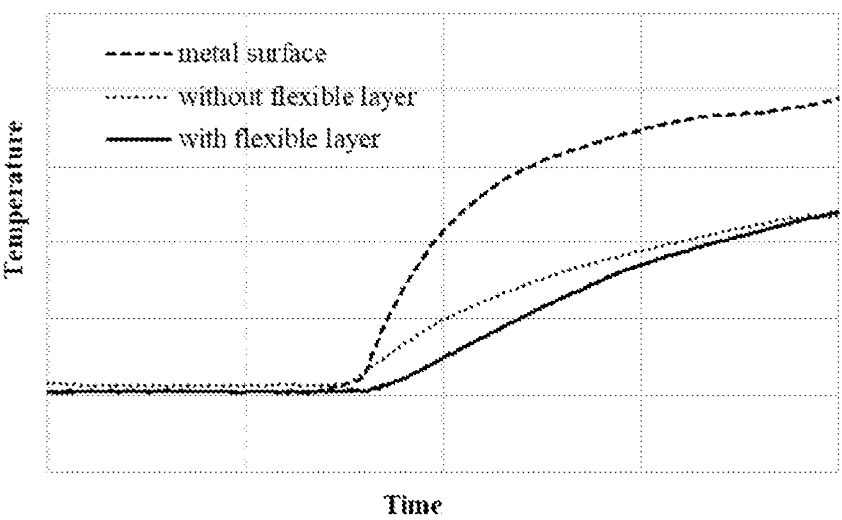
FIG. 15 is a schematic graph of a temporal change in temperature when a sensor is attached to a deformable portion via or not via a flexible layer according to an embodiment of the present disclosure.

Reference is made to FIG. 15, where an example is illustrated to show an effect of the thermal-conduction delay. FIG. 15 is a schematic graph of a temporal change in temperature when a sensor is attached to a deformable portion via or not via a flexible layer according to an embodiment of the present disclosure. In this example, the deformable portion is of a metal surface. It can be seen that in case of the deformable portion being heated, the rise in temperature of the sensor is slower than that of the deformable portion, and is further delayed when the flexible layer is applied between the part of the sensor and the deformable portion.

Figure 16:
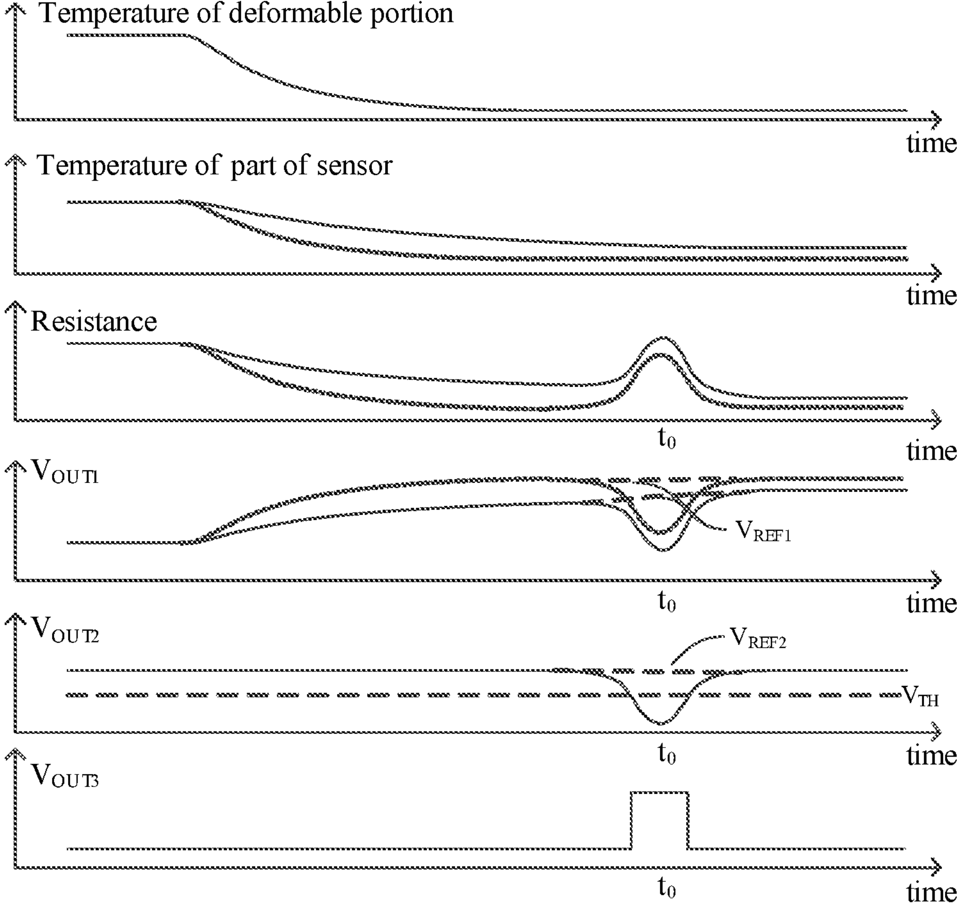
FIG. 16 is a schematic diagram of a change in signals with respect to a force (or a strain) and temperature of a deformable portion according to an embodiment of the present disclosure.

Reference is further made to FIG. 16, which is a schematic diagram of a change in signals with respect to a force (or a strain) and temperature of a deformable portion according to an embodiment of the present disclosure. In FIG. 16, the solid lines indicate a case in which the strain-sensitive element 2110 is attached to the deformable portion 11 via the flexible layer 25, the short-dashed lines indicate a case in which the strain-sensitive element 2110 is attached to the deformable portion 11 via no flexible layer 25, and the long-dashed lines indicate a reference signal or a threshold signal as labeled. It is assumed that the apparatus 20 adopts the structure as shown in FIG. 8 and the sensor adopts the structure as shown in FIG. 11. Similar to FIG. 6, it is taken as example that temperature of the deformable portion 11 is subject to a gradual decrease.

As shown in FIG. 16, the temperature of the part 210 (the strain-sensitive element 2110) of the sensor 21 is decreased with the temperature of the deformable portion 11. Similar to FIG. 15, the temporal change in the temperature of the strain-sensitive element 2110 is slower than that of the deformable portion 11, and the temporal change could be further delayed when the flexible layer 25 is applied. The inverting input signal $V_{IN1}$ of the first operational amplifier 2120 is gradually decreased even when there is no deformation of the deformable portion 11. Similar to the $V_{OUT}$ in FIG. 6, the first reference signal $V_{REF1}$ for the first signal $V_{OUT1}$ would drift to a higher level, regardless whether there is the flexible layer 25. Similar to the temperature of the strain-sensitive element 2110, the drifting of the first reference signal $V_{REF1}$ is also delayed when the flexible layer 25 is applied.

Different from the example as shown in FIG. 6, the filter 22 that receives the first signal $V_{OUT1}$ is capable to remove the drifting of the first reference signal $V_{REF1}$, because the drifting is slower than a change induced by deformation (for example, the valley occurred at moment to). Thereby, the second signal $V_{OUT2}$ outputted from the filter 22 does not include the drifting, and hence in both cases with and without the flexible layer 25, the second reference signal $V_{REF2}$ is maintained at a fixed level. That is, a difference between the second reference signal $V_{REF2}$ and the threshold signal $V_{TH}$ is kept constant. At the moment to, the second signal $V_{OUT2}$ dipping from second reference signal $V_{REF2}$ is capable to reach the threshold signal $V_{TH}$, just as what should happen before the temperature of the deformable portion 11 decreases. A bottom of the valley in the second signal $V_{OUT2}$ is lower than the threshold signal $V_{TH}$. Accordingly, the comparator 23 turns the third signal $V_{OUT3}$ into the active state, the hardware module 12 is informed of the deformation of the deformable portion, and the electronic device 10 is capable to recognize the deformation around the moment to and gives a proper response.

In this embodiment, it is taken as an example that the threshold signal $V_{TH}$ is lower than the second reference signal $V_{REF2}$, the deformation induces a valley in the first signal $V_{OUT1}$, the temperature is subject to a decrease, and the compensation would prevent the comparator 23 from giving a "false negative" result when determining whether the deformable portion 11 deforms. Another embodiment may be obtained by analogy, which also falls within the scope of the present disclosure. For example, the threshold signal $V_{TH}$ is higher than the second reference signal $V_{REF2}$ and the deformation induces a peak in the second signal $V_{OUT2}$. For another example, the temperature is subject to an increase, and the compensation would prevent the comparator 23 from giving a "false positive" result when determining whether the deformable portion 11 deforms.

In some embodiments, the threshold signal $V_{TH}$ may include a set of signals, based on a quantity of degrees of the deformation that are to be recognized by the hardware model 12. For example, the threshold signal $V_{TH}$ may include one or more signals for compression, such that different degrees of compression (or squeezing input operations) can be recognized by the hardware model 12. Alternatively or additionally, the threshold signal $V_{TH}$ may include one or more signals for tension, such that different degrees of tension (or stretching input operations) can be recognized by the hardware model 12.

In some embodiments, there may be multiple sensors 21 and/or multiple filters 22. For example, one sensor 21 may correspond to multiple filters 22, and each filter 22 is configured to remove a different frequency component in the first signal $V_{OUT1}$. The multiple filters 22 may be connected in series. In such case, the first signal $V_{OUT1}$ may pass multiple filters sequentially, and merely the frequency components corresponding to the deformation remains in the second signal $V_{OUT2}$. Additionally or alternatively, the multiple filters 22 may be connected in parallel. In such case, the first signal $V_{OUT1}$ may pass multiple filters separately, so that the second signal $V_{OUT2}$ includes multiple channels, and each channel may correspond to a different type of deformation which occurs at a different speed. For another example, one filter 22 may correspond to multiple sensors 21. The multiple sensors 21 may be located at different regions of the deformable portion 11, so as to detect deformation of different locations.

An electronic device is further provided according to embodiments of the present disclosure. References are made to FIGS. 7 and 8, where the electronic device 10 may include the aforementioned apparatus 20 for force sensing, the deformable region 11, and a hardware module 12. In FIG. 7, the hardware module 12 is configured to receive the second signal $V_{OUT2}$, and a state of the hardware module 12 changes in response to a state of the second signal $V_{OUT2}$ being changed. In FIG. 8, the hardware module 12 is configured to receive the third signal $V_{OUT3}$, and a state of the hardware module changes in response to the third signal $V_{OUT3}$ being active. In one embodiment, the hardware module may be a controller, a processor, a display, a speaker, a switch, an indicator light, or the like. It is appreciated that the hardware module may be in other forms, as long as it can change a state thereof according to the second signal $V_{OUT2}$ or the third signal $V_{OUT3}$.

The electronic device 10 may include a mobile phone, a watch, glasses, a head-mounted display device, an earbud, a keyboard, a tablet, or the like. The apparatus 20 for force sensing may be configured based on a structure of the electronic device 10 in practice. For example, the electronic device 10 is an earbud, a housing of the earbud includes a deformable cap (an outer shell), and a user can operate the earbud by squeezing or pressing the deformable cap. In such case, the apparatus 20 for force sensing may be located inside the housing, and the part 210 of the sensor 21 (or the strain-sensitive element 2110) is attached to an inner side of the deformable cap. The filter 22, the comparator 23, and the AD converter 24 may be integrated on one or more print circuit boards (PCBs) which are enclosed by the housing. For another example, the electronic device 10 is a foldable display device, a flexible display panel of the device is provided with a folding axis, and a user can switch on the device by opening the folded display panel. In such case, the apparatus 20 for force sensing may be located inside a foldable region of the display panel, and the part 210 of the sensor 21 (or the strain-sensitive element 2110) is attached to an inner side of the display screen at the foldable region. The filter 22, the comparator 23, and the AD converter 24 may be integrated in one or more processors of the display device.

A method for force sensing is further provided according to embodiments of the present disclosure. The method is applied to an electronic device, and may include steps S101 and S102.

In step S101, a sensor generates a first signal. The first signal is determined based on deformation of at least a part of the sensor and temperature of at least the part of the sensor, and the part of the sensor is attached to a deformable portion of the electronic device.

In step S102, a filter receives the first signal and removes a change from the first signal to acquire a second signal. The change is due to the temperature of the part of the sensor.

In one embodiment, the method further comprises steps S103 and S104.

In step S103, a comparator of at least one comparator receives the second signal and determines whether the deformable portion deforms, based on the second signal and a threshold signal.

In step S104, the comparator generates a third signal. The third signal is in an active state in response to determining that the deformable portion deforms.

In one embodiment, the threshold signal may include a threshold signal for compression. The step S103 includes that the comparator determines whether the deformable portion is squeezed, based on the second signal and the threshold signal for compression. The third signal is in the active state in response to the deformable portion being squeezed.

In one embodiment, the threshold signal may include a threshold signal for tension. The step S103 includes that the comparator determines whether the deformable portion is stretched, based on the second signal and the threshold signal for tension. The third signal is in the active state in response to the deformable portion being stretched.

In one embodiment, there are multiple groups of sensors and filters, and the multiple groups are located at different regions of the deformable portion. The step S103 includes that the comparator determines whether each of the different regions deforms, based on an output signal of the corresponding filter and the threshold signal.

The embodiments of the present disclosure are described in a progressive manner, and each embodiment places emphasis on the difference from other embodiments. Therefore, one embodiment can refer to other embodiments for the same or similar parts. Since the methods disclosed in the embodiments correspond to the apparatuses disclosed in the embodiments, the description of the methods is simple, and reference may be made to the relevant part of the apparatuses.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but confirms to a widest scope in accordance with principles and novel features disclosed in the present disclosure.

The invention claimed is:

1. An apparatus for force sensing, located in an electronic device, wherein the electronic device comprises a deformable portion, and the apparatus comprises:

a sensor, configured to generate a first signal, wherein the first signal comprises a component of higher frequency corresponding to deformation of at least a part of the sensor and a component of lower frequency corresponding to temperature of at least the part of the sensor, and the part of the sensor is attached to the deformable portion;

a flexible layer, attached to the deformable portion; and a filter, configured to:

receive the first signal; and remove the component of lower frequency from the first signal to acquire a second signal, wherein the part of the sensor is attached to the deformable portion via at least a part of the flexible layer, wherein the flexible layer comprises one or both of:

a layer made of a thermal insulating material; and a heat spreading layer, in which thermal conductivity along a thickness of the heat spreading layer is smaller than thermal conductivity within a plane perpendicular to the thickness of the heat spreading layer.

2. The apparatus according to claim 1, further comprising at least one comparator, wherein a comparator of the at least one comparator is configured to:

receive the second signal;

determine, based on the second signal and a threshold signal, whether the deformable portion deforms; and generate a third signal, wherein the third signal is in an active state in response to determining that the deformable portion deforms.

3. The apparatus according to claim 2, further comprising an analog-to-digital converter, wherein:

the filter is an analog filter, and the analog-to-digital converter is configured to convert the second signal into a digital signal before the second signal is inputted into the comparator; or the filter is a digital filter, and the analog-to-digital converter is configured to convert the first signal into a digital signal before the first signal is inputted into the comparator.

4. The apparatus according to claim 3, wherein:

the threshold signal comprises a threshold signal for compression;

the comparator is further configured to determine whether the deformable portion is squeezed, based on the second signal and the threshold signal for compression; and the third signal is in the active state in response to the deformable portion being squeezed.

5. The apparatus according to claim 3, wherein:

the threshold signal comprises a threshold signal for tension;

the comparator is further configured to determine whether the deformable portion is stretched, based on the second signal and the threshold signal for tension; and the third signal is in the active state in response to the deformable portion being stretched.

6. The apparatus according to claim 1, wherein the part of the sensor is a strain-sensitive element.

7. The apparatus according to claim 6, wherein the sensor comprises a Wheatstone-bridge circuit and an amplifier circuit, an arm of the Wheatstone-bridge circuit comprises the strain-sensitive element;

the amplifier circuit comprises an operational amplifier, an inverting input terminal and a non-inverting input terminal of the operational amplifier are coupled to two output terminals, respectively, of the Wheatstone-bridge circuit, and an output terminal of the operational amplifier is coupled to an input terminal of the filter; and the first signal comprises a first signal outputted from the output terminal of the operational amplifier.

8. The apparatus according to claim 6, wherein the strain-sensitive element is a strain gauge.

9. The apparatus according to claim 6, wherein the strain-sensitive element is a metallic foil pattern of a strain gauge, and the flexible layer is a backing layer on which the metallic foil pattern is printed.

10. The apparatus according to claim 1, wherein the part of the sensor is embedded within the flexible layer.

11. The apparatus according to claim 1, wherein in the heat spreading layer, the thermal conductivity along the thickness of the heat spreading layer is a tenth of the thermal conductivity within the plane perpendicular to the thickness of the heat spreading layer.

12. The apparatus according to claim 1, wherein thermal conductivity of the thermal insulating material is equal to or smaller than 0.1 W/mK along a thickness of the flexible layer.

13. The apparatus according to claim 1, wherein the thermal insulating material comprises one or more graphite sheets, rock wool, or pulp.

14. The apparatus according to claim 1, wherein a thickness of the part of the flexible layer ranges from 25 μm to 500 um.

15. An electronic device, comprising:

the apparatus according to claim 1;

the deformable portion;

a hardware module, configured to:

receive the second signal, where a state of the hardware module changes in response to a state of the second signal being changed; or receive the third signal, wherein a state of the hardware module changes in response to the third signal being in the active state.

16. The electronic device according to claim 15, comprising at least one of: a mobile phone, a watch, glasses, a head-mounted display device, an earbud, a keyboard, or a tablet.

17. A method for force sensing, applied to an electronic device, comprising:

generating a first signal by a sensor, wherein the first signal comprises a component of higher frequency corresponding to deformation of at least a part of the sensor and a component of lower frequency corresponding to temperature of at least the part of the sensor, and the part of the sensor is attached to a deformable portion of the electronic device, a flexible layer being attached to the deformable portion;

receiving the first signal by a filter; and removing, by the filter, the component of lower frequency from the first signal to acquire a second signal, wherein the part of the sensor is attached to the deformable portion via at least a part of the flexible layer, wherein the flexible layer comprises one or both of:

a layer made of a thermal insulating material; and a heat spreading layer, in which thermal conductivity along a thickness of the heat spreading layer is smaller than thermal conductivity within a plane perpendicular to the thickness of the heat spreading layer.

18. The method according to claim 17, further comprising:

receiving the second signal by a comparator of at least one comparator;

determining, by the comparator based on the second signal and a threshold signal, whether the deformable portion deforms; and generating a third signal by the comparator, wherein the third signal is in an active state in response to determining that the deformable portion deforms.

19. The method according to claim 18, wherein:

the threshold signal comprises a threshold signal for compression;

the determining whether the deformable portion deforms comprises: determining whether the deformable portion is squeezed, based on the second signal and the threshold signal for compression; and the third signal is in the active state in response to the deformable portion being squeezed.

20. The method according to claim 18, wherein:

the threshold signal comprises a threshold signal for tension;

the determining whether the deformable portion deforms comprises: determining whether the deformable portion is stretched, based on the second signal and the threshold signal for tension; and the third signal is in the active state in response to the deformable portion being stretched.

* * * * *